Jan. 18, 1938.                B. M. SELF                2,105,703
                    GAUGE OR INDICATOR FOR LATHES
                Filed July 9, 1937            3 Sheets-Sheet 1

INVENTOR.
Benjamin Milton Self
BY Louis Chayka
ATTORNEY.

Jan. 18, 1938.                B. M. SELF                2,105,703
                    GAUGE OR INDICATOR FOR LATHES
                    Filed July 9, 1937        3 Sheets-Sheet 2
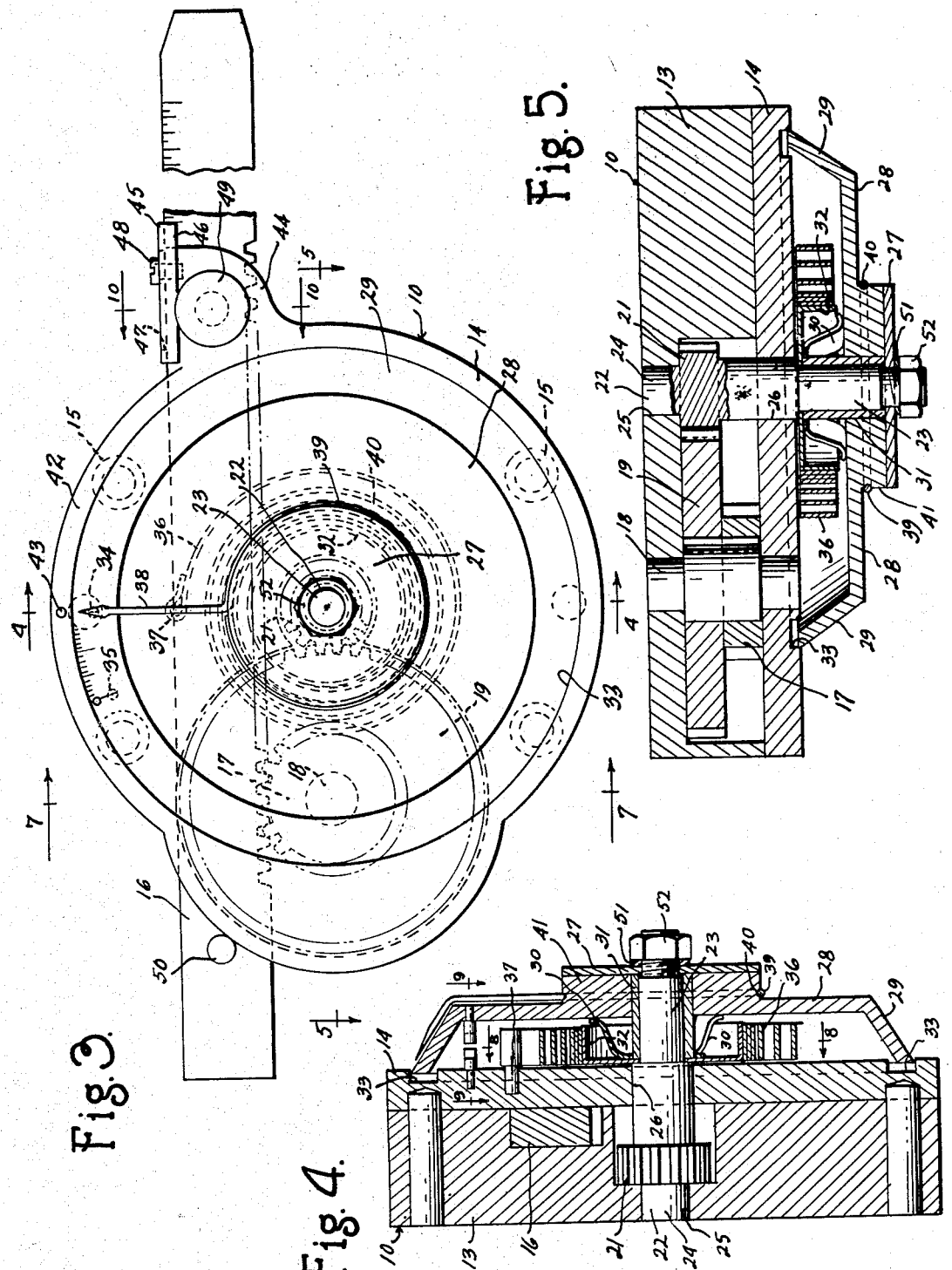
INVENTOR.
Benjamin Milton Self
BY Louis Chayka
ATTORNEY.

Jan. 18, 1938.  B. M. SELF  2,105,703
GAUGE OR INDICATOR FOR LATHES
Filed July 9, 1937  3 Sheets-Sheet 3
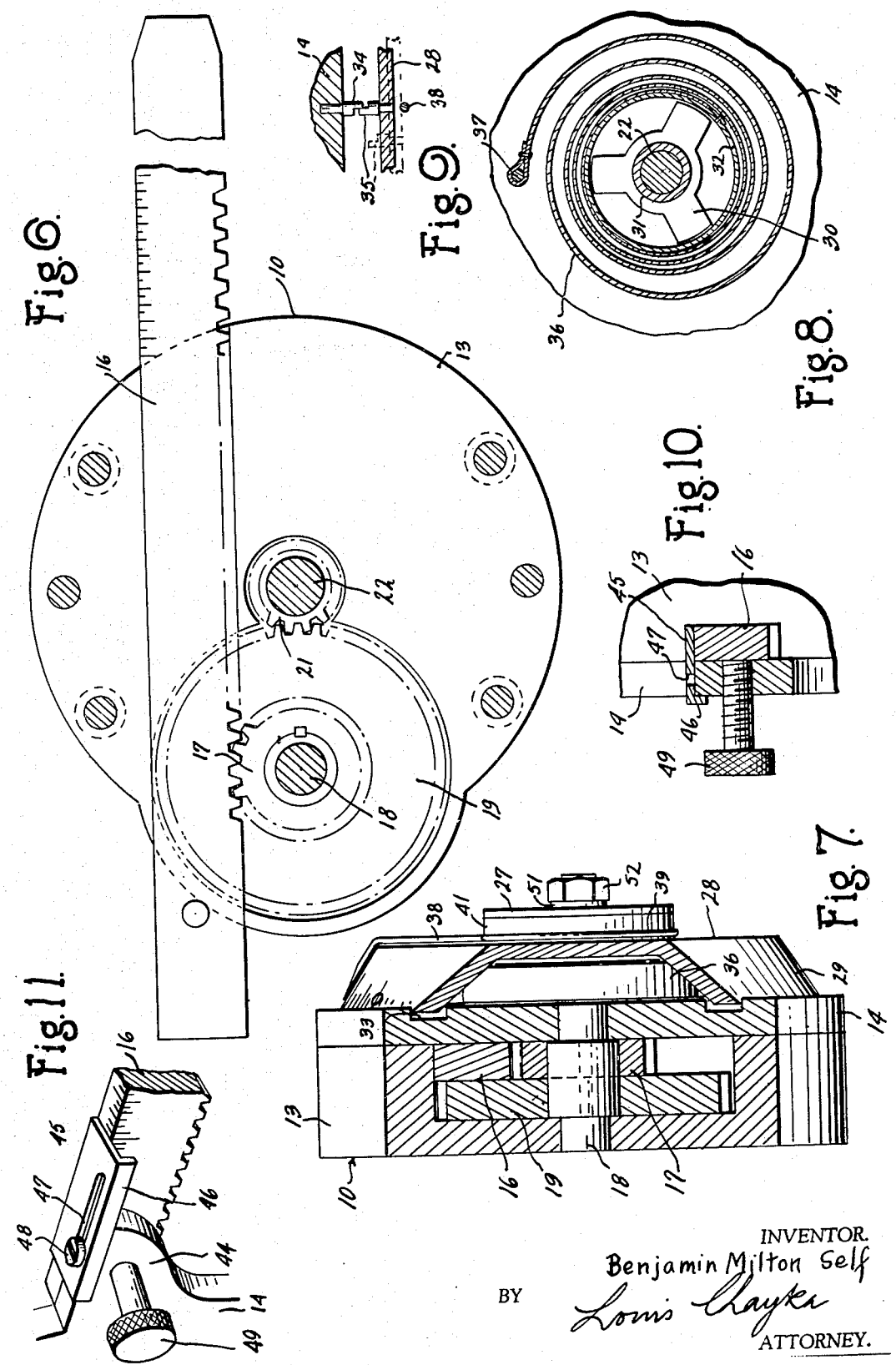
INVENTOR.
Benjamin Milton Self
BY
Louis Alayka
ATTORNEY.

Patented Jan. 18, 1938

2,105,703

UNITED STATES PATENT OFFICE 2,105,703

GAUGE OR INDICATOR FOR LATHES

Benjiman Milton Self, Detroit, Mich.

Application July 9, 1937, Serial No. 152,692

4 Claims. (Cl. 82—34)

The purpose of my improvement is to provide a device which would indicate the exact length of a cut performed by the cutting tools of a lathe, or, in other words, the distance the tool carrier has travelled in a given operation. A reliable device of this sort was long needed in industry as it would effect a considerable saving of time in performing work turned on lathes where accuracy is of importance. Up to this time, when precision work was involved, it was necessary quite frequently to withdraw the cutter from the object to which it was applied and to gauge the distance of a cut or otherwise examine the length of the work performed. The purpose of my invention, therefore, is to obviate this difficulty, to provide means whereby the operator working on a lathe would in every instance know exactly how far the tool carrier has progressed, what length of the work has been cut and when a desired limit of the cut has been reached. In addition, my device is designed in such a manner that these measurements are indicated directly without requiring any calculations or computations on the part of the operator.

Another important feature of my indicator is the fact that the measurements shown by said indicator are magnified, that is, that the distances shown on the dial are much larger than the length of the actual cut performed by the lathe. A further purpose of my improvement is to produce a device that can be easily attached to the lathe without introducing any changes in the construction of the lathe and without adding any parts to the lathe. Additionally, my purpose is to provide an indicator that will be simple, reliable, capable of performing precision work and that will not get out of adjustment with use and wear. I am accomplishing these purposes by construction which will be described with reference to the accompanying drawings, in which:

Fig. 3 is a front elevation of the device.

Fig. 4 is a sectional view taken on line 4—4 of Fig. 3.

Fig. 5 is another sectional view of the device taken on line 5—5 of Fig. 3.

Fig. 6 shows the train of gears in said device.

Fig. 7 is a sectional view of the device taken on line 7—7 in Fig. 3.

Fig. 8 shows a sectional view of the device taken on line 8—8 in Fig. 4.

Fig. 9 is a sectional view taken on line 9—9 of Fig. 4.

Fig. 10 shows a sectional view of a part of the device taken on line 10—10 in Fig. 3.

Fig. 11 is a perspective view of an additional gauge cooperating with the main indicator of the device.

Similar numerals refer to similar parts throughout the several views.

Figure 1:
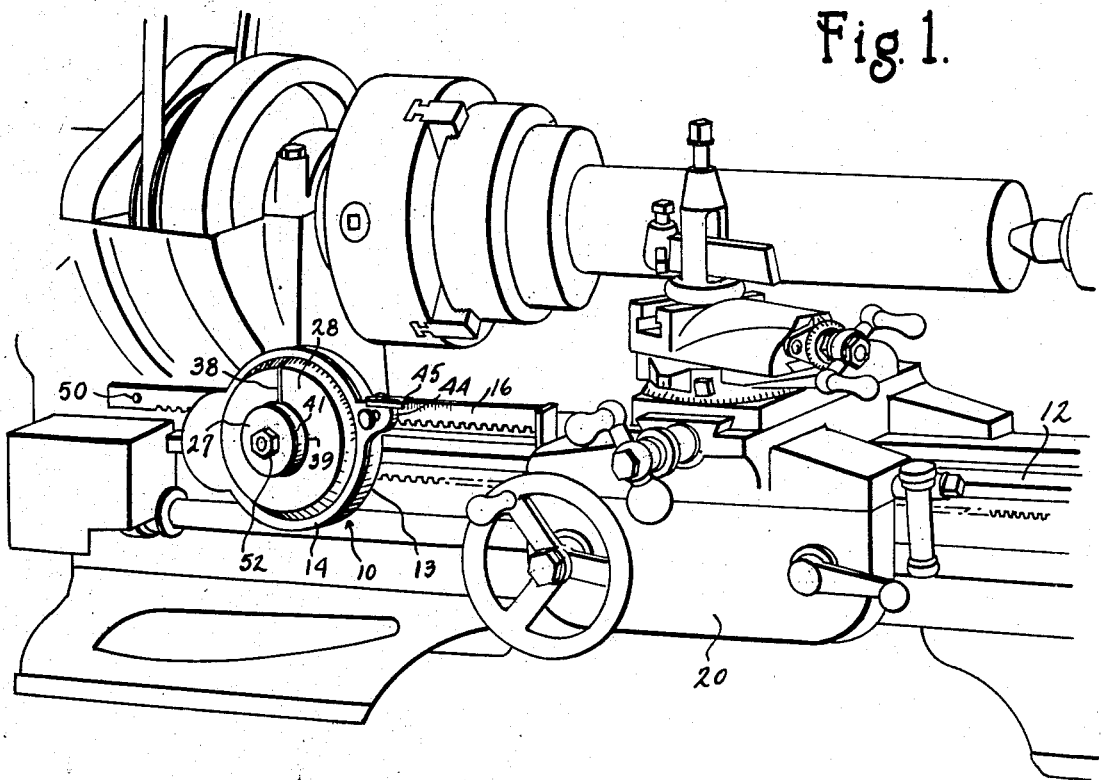
Fig. 1 shows my device as attached to the lathe.
Figure 2:
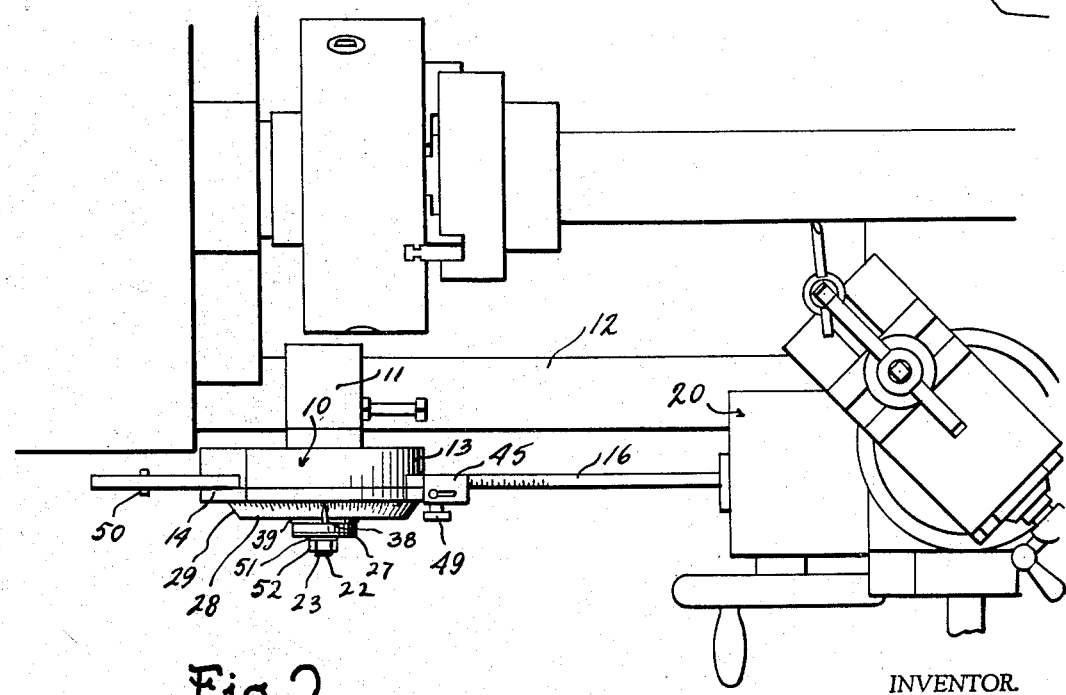
Fig. 2 is a top view of said attachment as it is mounted on the lathe.

The indicator as a whole, marked 10, is shown in Fig. 1 and is attached to the lathe by member 11 in a manner the details of which are not shown as the construction of lathes differs and said member 11 may assume different forms. The mechanism of the indicator is contained in a casing supported by said member 11 and consists of two parts, 13, which is the rear part, and 14 which constitutes a cover therefor, both of these parts being held together by bolts or screws 15. The rear part of the housing is provided with a channel disposed horizontally in the upper half of the indicator and accommodates a movable rack 16. Said rack is meshed with a pinion 17 mounted below said rack on a shaft 18. Said shaft and pinion are formed integrally, although the pinion may be formed separately and keyed to said shaft. Mounted on said shaft 18, co-axially with said pinion, is a toothed wheel 19 geared to pinion 21 on shaft 22 and centrally disposed within the indicator. All the above gears are contained in said casing under cover 14. Pinion 21 is integral with shaft 22 located centrally within said indicator, the ends of said shaft 23 and 24 being reduced and supported in bearings 25 and 26, respectively. I wish to say that instead of being integral, said pinion 21 may be separate and keyed to shaft 22. While the drawings show only ordinary bearings, it is quite possible and even desirable to substitute in their place roller bearings. The reduced portion 23 of the shaft carries a disk 27, hereinafter referred to as friction disk. It is between this disk, held firmly on the shaft by means of a washer 51 and a nut 52 and the cover 14, that the dial 28 is rotatably seated on said shaft 23. The dial itself is disk-like in form, the rims thereof 29 being turned inwardly so that the dial in cross-section presents a dish-like appearance. The outside surface of the in-turned rims 29 is calibrated suitably. This detail will be explained separately below.

The dial is normally in contact with the friction disk and retained in this contact by the tension of spider spring 30 shown in plan view in Fig. 8. The spring straddles a bushing 31, seated on shaft 23, the inside end of said bushing bearing against the bottom of a cup-shaped member 32 co-axially aligned with said spring. At this point, I wish to explain that while the cup is made to rotate always with the shaft 23, the spider spring is capable of an independent sliding rotary motion within the cup.

The face of the cover 14 is provided with an annular groove 33 just opposite the rim 29 of dial 28. Normally, the rim of the dial is close to the cover 14 of the casing or rather partly within the annular groove 33 just opposite therein so as to prevent any chips or particles of any metal or other material to fall into the interior of the casing. However, the groove is deep enough to allow the dial to be depressed manually towards the cover, as will be shown hereinafter.

In a line directly above axle 22 and below the annular groove 33 is pin 34 projecting above the surface of said cover. Pin 35 corresponding thereto is placed on the inside surface of the dial 28, but normally, when said dial is rotated, is in a position to clear said pin 34. When, however, the dial is depressed in the direction of the cover, for the purpose of setting said dial manually, pin 35 comes in the course of the rotation of the dial in direct contact with stationary pin 34 so that the rotation of said dial is checked thereby.

An important element of my indicator is a coiled spring 36, one end of which is anchored to a stationary pin 37 on the outside surface of cover 14, while the other end of said spring is secured to the side wall of the cup 32 and through the medium thereof to the axle 23. Normally, through the medium of gears within the casing, said spring exerts a tension upon rack 16, thrusting said rack to the limit of its motion out of said casing in the direction of the tool carriage of the lathe.

The diameter of the casing being somewhat larger than the diameter of the dial, the rim 42 of said casing is visible when the indicator is viewed from the front. Since the reading on the rotary dial have to be taken with reference to some stationary point, as will be shown hereinafter, it is this rim that carries a fixed mark 43 located vertically above the axle 22 and in line with the stationary pin 34. At this point, I wish to add that the meeting faces of pins 34 and 35 are flat so that when the pins are in contact the plane of said contact is also the plane passing through the middle of the fixed mark 43 on the rim of the dial. Serving as an important element in indicating distances on said calibrated dial 28 is a pointer 38 extending from a ringlike clamp 39 which is disposed on the dial in a groove 40 between the knoblike formation 41 and a disklike body of said dial. The pointer is rotatably movable with respect to its seat and may be manually adjusted to indicate any desired point on the dial.

The above is the description of the main part of the indicator. I shall now add the description of an auxiliary structure for reading of the lengths of cuts effected by the lathe. For this purpose, the cover 14 is provided on one side with a lateral shoulder 44. The top of the shoulder is on the level of the rack 16 and supports a slidable angle plate 45 comprising a flange 46 and provided with a slot 47. Said flange abuts the side of the shoulder serving with the screw 48 on top of said shoulder and within the slot to retain and to guide said plate 45. The screw may be a thumb-screw for manual operation without any tools.

The plate may be slid back and forth and adjustably screwed to a fixed position on said shoulder when the outward end of the plate may be considered a fixed point with reference to the moving calibrated rack 16. These calibrations, both on top of the rack and on the side thereof, are shown best in Fig. 11.

By way of accessory refinements, the indicator has a provision for locking the rack in a selected position, especially when it is desired to have the rack out of the way or when the indicator is not being used. This is accomplished by the employment of a thumb-screw 49 located in the shoulder 44 and bearing against the side of the rack 16. At the opposite end, said rack is equipped with a stop pin 50 in the side thereof to prevent the end of said rack being drawn in its entirety into the casing. In this connection, I wish to say that the length of the rack is optional, depending upon the size of the lathe and the kind of work performed therein. It may be even desirable to have a few racks of different lengths for each indicator and to use therein a rack of such length as may be most suitable.

The indicator is constructed in such a manner that for a relatively small distance of the travel of the rack there is a considerable travel of the dial. While any desired ratio between the travel of the rack and between the travel of the dial may be obtained by suitable arrangement of the gears, the preferred embodiment is such that the dial makes a complete revolution around its axle for each one-half of an inch of distance travelled by the rack. In this arrangement, one point of the rim of the dial, opposite pin 35, carries a chosen mark, say, a zero, which serves as the initial point of calculation, the whole dial being calibrated into five hundred equal parts, each of which is equivalent to one-thousandth of an inch of travel of the rack. It will be thus seen that the indicator is particularly fitted for work where accurate and minute measurements are of importance. Ordinarily, where the rack is only brought into contact with the tool carriage, there would be always a danger of a play or backlash between said rack and said carriage so that the distance measuring between the dial would probably vary a few thousandths of an inch from the distance actually travelled. Therefore, to secure an absolute contact at all times between the rack and between the tool carriage, I have introduced into my indicator the coiled spring 36. Actuated by said spring, the rack bears against the tool carriage, or when the carriage is beyond its reach, the rack extends to its full operative length towards said carriage to the limit allowed by the stop pin 50.

When it is required that the indicator show a predetermined length of a cut to be made on said lathe, the tool carrier is first brought to the initial point of the intended cut on the object worked upon. This having been done, the dial is next appropriately set for the operation. The procedure is as follows:

We will assume for the sake of an example that the zero mark on the dial is to the left of the fixed mark 43 on the rim of the cover of the casing, as shown in Fig. 3, although it may be at any other point along the circumference of the rim. Before adjusting the indicator for any desired distance of travel, the dial has to be set so that the fixed mark 43 on the rim and the fixed initial mark zero on the dial are radially aligned with respect to the dial. In other words, the initial mark zero on the dial is directly below the fixed mark on the rim. This is effected by applying pressure by hand to the face of the dial inwardly towards the cover of the casing and against the tension of the spider spring 30 in order to disengage said dial from the contact with the friction disk 27. The dial is rotated to the right until pin 35 on the inside surface of the dial comes into contact with the stationary pin 34 on the cover 14 of the casing of the indicator and is stopped thereby. When the dial is in this position and said mark 43 on the rim and the zero mark on the dial are aligned, the dial is in readiness to be set for its gauging operation. It will be assumed that the length of the desired cut by the tool in the carriage is a quarter of an inch which equals one-half of the capacity of the dial. Such being the case, hand 38 is manually set by being turned to the left or to the right down to a point diametrically opposite set fixed mark 43, or 180° from said mark. The hand having been thus set, the operator is in a position to begin the turning operation. It will be remembered that the rack is under the tension of a spring so that the contact between said rack and said carriage will at all times be true and perfect. As the turning operation begins, the tool carriage progresses towards the left, that is, towards the stationary part of the indicator, and bears against the movable rack 16 transmitting its motion through the medium of the pinion 17, geared wheel 19, pinion 21, to the dial axle 22 and to the friction disk 27. The latter being in a frictional contact with the dial, imparts its rotary motion to the dial which is thus carried in a rotary motion in a direction reversed to the direction of the travel of the rack.

Since hand 38 is seated upon the knoblike part of the dial, it travels with the dial indicating the progress of the cut, but owing to the adapted ratio of gearing, the distance travelled by the carriage is greatly magnified so that the operator may watch the progress of the cut with ease. When the hand traveling with said dial comes directly above the fixed mark on the rim, this is an indication that the predetermined and desired length of the cut has been completed. Should it be desired to start another cut for another distance, all the operator has to do is to again depress the dial, turn it to the right until pins 34 and 35 come into contact and then again set the hand manually as before for the selected distance of travel.

It will be remembered that although pins 34 and 35 are brought in contact in the setting operation of the dial, this happens only when the dial is depressed manually towards the cover of the casing. Normally, however, the tension of the spider spring 30 keeps the dial in a spaced relation with respect to said casing and pin 34, so that pin 35 is able to clear said pin 34 when the dial is actuated by the travel of the rack.

As an additional means of gauging the progress of work on the lathe, my indicator is provided with a sliding plate 45, its outward end being considered a fixed mark with reference to the calibration on the rack 16. This construction was described above. Here, however, the distance shown by the rack is the actual distance travelled by said rack. Owing to this construction, the indicator as a whole shows at the same time the travelled distance in magnification on the dial and the actual distance without any magnification on said rack. For the convenience of the operator, the plate 45 may be slid back and forth to coincide with a selected mark on the rack, particularly for the purpose of avoiding any fractional divisions on said rack. In other words, this means that the operator may set the sliding plate to coincide with the one-eighth or one-quarter, or any other divisional mark, of an inch on said rack.

Having thus described my indicator, it being obvious that many variations are possible in the construction thereof without departing from the spirit of my invention, what I claim is:

1. In a stationary indicator for lathes, a casing, a horizontally disposed rack passing through said casing, the end of said rack bearing against the movable carriage of the lathe, a train of gears actuated by said rack, a rotary dial actuated by said train of gears and responsive to the movement of said rack, friction means to retain said dial in operative connection with said train of gears, and means to disengage said dial from said train of gears, a pointer rotatably seated upon said dial and adapted to be selectively set upon the face of said dial, and spring means acting upon said rack to thrust said rack into a positive contact with the movable tool carriage.

2. In a stationary indicator for lathes, a casing, a horizontally disposed rack passing through said casing, the end of said rack bearing against the movable carriage of the lathe, a train of gears actuated by said rack, a rotary dial actuated by said train of gears and responsive to the movement of said rack to show the distance of travel of said rack in a multiple distance of travel of said dial, friction means to retain said dial in operative connection with said train of gears, and means to disengage said dial from said train of gears, a pointer rotatably seated upon said dial and adapted to be selectively set upon the face of said dial, and spring means acting upon said rack through the medium of said gears to thrust said rack into a positive contact with the movable tool carriage.

3. A stationary indicator for a lathe, equipped with a movable tool carriage, said indicator comprising a casing, in which a movable rack, actuated by the tool carriage of the lathe, sets in motion through the medium of a train of gears, a rotary dial to indicate in magnification the distance of travel of said rack and comprising further spring means thrusting the rack against the tool carriage of the lathe in a direction opposed to the direction of travel of said tool carriage, said dial being adapted to be disengaged from said train of gears for the purpose of setting it for a pre-determined distance and being equipped with a rotatably movable pointer seated on the face of the dial travelling in a rotary motion with same but adapted to be selectively set on said dial and serving to indicate distances with reference to a stationary mark on the casing of the indicator.

4. In a detachable indicator for lathes equipped with a movable tool carriage, a casing, a movable calibrated rack bearing against said tool carriage and actuated by the operative movement thereof, a rotary dial responsive to the movement of said rack and showing the distance of its travel in magnification, adjustable, slidable plate on said casing extending over the movable rack, the end of said plate serving as a fixed mark for direct reading of distance travelled by said rack, means to disengage the dial from connection with the rack and to set it for a gauging operation, and spring means thrusting said rack in a direction opposed to the movement of said carriage.

BENJIMAN MILTON SELF.